(12) United States Patent
Vadlapudi et al.

(10) Patent No.: US 7,987,505 B2
(45) Date of Patent: *Jul. 26, 2011

(54) APPARATUS AND METHOD FOR TRIGGERING SESSION RE-NEGOTIATION BETWEEN ACCESS NETWORK AND ACCESS TERMINAL IN A HIGH RATE PACKET DATA SYSTEM

(75) Inventors: Tirumala Sree Hari Vara Prasad Vadlapudi, Karnataka (IN); Richa Dham, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,846

(22) Filed: May 6, 2010

(65) Prior Publication Data

US 2010/0223388 A1 Sep. 2, 2010

Related U.S. Application Data

(63) Continuation of application No. 11/405,007, filed on Apr. 17, 2006, now Pat. No. 7,725,722.

(30) Foreign Application Priority Data

Apr. 15, 2005 (IN) .............................. 433/CHE/2005

(51) Int. Cl.
*G06F 17/00* (2006.01)
(52) U.S. Cl. ....................................................... 726/14
(58) Field of Classification Search ........................ None
See application file for complete search history.

(56) References Cited

U.S. PATENT DOCUMENTS

| 2003/0135626 A1 | 7/2003 | Ray et al. |
| 2003/0145091 A1* | 7/2003 | Peng et al. .................... 709/229 |
| 2006/0176881 A1* | 8/2006 | Ma et al. ....................... 370/392 |

FOREIGN PATENT DOCUMENTS

| JP | 2002-525935 | 8/2002 |
| KR | 10-2004-12299 A | 2/2004 |
| WO | WO00/16577 | 3/2000 |
| WO | WO03/088703 | 10/2003 |
| WO | WO 2004-079947 A1 | 9/2004 |

* cited by examiner

*Primary Examiner* — Brandon S Hoffman
(74) *Attorney, Agent, or Firm* — Roylance, Abrams, Berdo & Goodman L.L.P.

(57) ABSTRACT

The invention relates to a method for triggering re-negotiation of a session when an Access Terminal moves from one access network (source AN) to another access network (target AN) having different capabilities in high rate packet data system. According to an exemplary embodiment of the invention, the source AN is allowed to store all the protocol subtypes, protocols and applications that AT is capable of and also allowing the AT to send this information in priority order during session negotiation and hence facilitating the transfer of this information from source AN to target AN during session transfer when AT moves from one AN to another AN. An alternate embodiment is to let the AT send the protocol subtypes, protocols and applications and other AT capable information to target AN after it moves to a new AN or by letting the Rev-A capable AN query the AT's capability information and then the AT providing this information. In another exemplary embodiment, the invention includes re-negotiation by introducing a revision (like Protocol revision) information in overhead information messages that an AN broadcasts to all ATs.

8 Claims, 5 Drawing Sheets

APPARATUS AND METHOD FOR TRIGGERING SESSION RE-NEGOTIATION BETWEEN ACCESS NETWORK AND ACCESS TERMINAL IN A HIGH RATE PACKET DATA SYSTEM

CROSS-REFERENCE TO RELATED APPLICATIONS

This is a continuation application of U.S. patent application Ser. No. 11/405,007 now U.S. Pat. No. 7,725,722, filed on Apr. 17, 2006 in the U.S. Patent and Trademark Office, the entire disclosure of which is incorporated herein by reference. Additionally, this application claims the benefit under 35 U.S.C. §119(a) of Indian Patent Application Serial No. 433/CHE/2005, filed on Apr. 15, 2005, in the Indian Patent Office, the entire contents of which are incorporated herein by reference.

BACKGROUND OF THE INVENTION

1. Field of Technology

This invention relates to the field of wireless mobile communication and in particular to cellular communication. It is further related with HRPD, EV-DO, CDMA2000, session negotiation, dormant handoff, and the like. More particularly, the present invention relates to a method for triggering re-negotiation of a session when an Access Terminal moves from one access network (i.e. source AN) to another network (i.e. target AN) having different capabilities in a high rate packet data system.

2. Description of the Related Art

In CDMA 2000 1x High Rate Packet Data (HRPD) systems as defined by 3GPP2, a region is divided into subnets and subnets may contain multiple cells with each cell being served by a Base Transceiver Station (BTS). A cell is a physical grouping of one or more sectors that transmit the same power control command to an access terminal where each sector is a part of the access network that is identified as providing one CDMA channel. The Access Network (AN), in other words the network equipment providing data connectivity between a packet switched data network (typically the Internet) and the access terminal, covers one or more subnets. An Access Terminal (AT) is an entity, which a user can use to get a service from an AN in an HRPD system. An AT may be connected to a computing device such as laptop or personal computer. It can also be a self-contained data device such as a personal digital assistant. An Access Network (AN) in an HRPD system performs session negotiation, resource allocation and mobility management among other functions.

In an HRPD network, each AT is assigned a Unicast Access Terminal Identifier (UATI) which is universally unique and is used to address the mobile terminal when an AN sends messages to the AT. Whenever an AT crosses a subnet (e.g.: foot print of an AN), the AT sends a UATI Request message.

FIG. 1 shows the structure of a Sector ID/UATI and derivation of a subnet address from a Sector ID/UATI. The following can be observed:

The Sector Id is divided into two portions. The 'n' most significant bits (MSBs) represent the identifier for the subnet and the lower '128-n' bits identify a particular sector within a subnet.

A subnet mask of length 'n' is a 128 bit value whose binary representation consists of 'n' consecutive '1's followed by '128-n' consecutive '0's.

The subnet address from a Sector ID/UATI is obtained by performing a logical AND of the address and the subnet mask.

Each sector advertises its Sector ID, which is also a 128-bit address. This is how the AT knows that it has entered the foot-print of a new subnet.

A UATI has a similar structure as a Sector ID. A full UATI is of size 128 bits. A UATI is subdivided into UATI 104 and UATI 024, which signify 104 MSBs and 24 least significant bits (LSBs) of the UATI respectively. If an AN does not send the UATI 104 and UATISubnetMask fields in a UATIAssignment message, then they can be derived from SectorID [127:24] and subnet mask of a SectorParameters message of that particular sector.

An AT sends a UATI request message on an Access Channel, which is the portion of the Reverse Channel that is used by ATs to communicate with the AN when they do not have a traffic channel assigned (there is a separate Reverse Access Channel for each sector of the AN).

While sending a UATI request message, an AT includes the "ColorCode|UATI [23:0]" in the MAC layer header of every Access Channel capsule, where '|' denotes the concatenation operator. For Unicast packets, the MAC layer header of the Control Channel and Access Channel include the 'ColorCode|UATI[23:0]'. Color code is used because sending a 128-bit UATI takes too much space in the Access and Control Channel messages. The subnet part of the sector ID is compressed to an 8-bit color code and is used as an alias for the subnet address. When the subnet of the sector changes, the color code changes. This is shown in FIG. 2.

ColorCode is only 8-bits and therefore cannot be globally unique. It implies that Color Codes can be reused. The ColorCode re-use scheme must ensure that there is no sector that has two or more neighboring sectors which are in different subnets but which use same ColorCode. An example ColorCode re-use scheme is shown in FIG. 3.

Once an AT determines that it has crossed a subnet (or AN foot-print), then the AT sends a UATI Request message to the new AN (which will be referred to as "target AN" henceforth) on access channel with UATIType=10 in Access Terminal Identifier record (ATI record) of MAC header. Upon seeing the UATI Request message, the target AN determines the address of the source AN.

The target AN may be provisioned with a table that maps the <Source ColorCode, Target SectorID> to the address of the source AN. In particular, for each target AN sector, a table may be provisioned that maps the ColorCode of each of the sector's adjacent subnets to the address of the AN responsible for the subnet. Hence the target AN determines the address of the source AN that corresponds to the ColorCode received in the MAC layer header by performing a table look-up in the appropriate above mentioned table.

An example of call flow for triggering the session retrieval and the actual session transfer from source AN to target AN is shown in FIG. 4. The following stages are involved in the process:

a. Once an AT recognizes that it crossed an AN (or subnet) footprint, the AT sends the UATI of an existing HRPD session (if available) to the target AN. The UATI can be used as an identifier for the existing HRPD session when the target AN attempts to retrieve the existing HRPD session State Information from the source AN.

b. The target AN sends an A13-Session Information Request message to the source AN to request the HRPD session information for the AT. The A13-Session Information Request message shall include the received UATI, the Security Layer Packet and Sector ID. The target AN starts timer TA13req.

c. The source AN validates the A13-Session Information Request and sends the requested HRPD session information of the AT to the target AN in an A13-Session Information Response message. The target AN stops timer TA13req.

d. The AT and the target AN complete the establishment of the HRPD session. Depending on the state of the AT and the target AN, either an existing HRPD session may be re-established, or a new HRPD session may be initiated if required. This step may be null if no further over-the-air signaling is required.

e. The target AN sends an A13-Session Information Confirm to the source AN to indicate that the target AN has received the HRPD session information. Upon receipt of the A13-Session Information Confirm message, the source AN deletes the associated AT HRPD session information.

It is essential to mention here that the HRPD specification has various protocols each having many subtypes. Each protocol also has a default sub-type that is supported by all ATs and ANs, which are compliant to the HRPD specification. The HRPD specification has undergone a revision in which new subtypes for existing protocols and also new protocols and applications are introduced. By introducing the new protocol subtypes, new protocols and new applications, an AT's capabilities are enhanced and also Quality of Service (QoS) for many applications is ensured. For the purpose of discussion here, the first revision can be referred to as Rev-0 and the next revision as Rev-A.

Now, the case will be considered of an AT which is capable of Rev-A protocols but is powered up in a Rev-0 AN and hence the session negotiated uses all Rev-0 protocols. If the AT moves from the Rev-0 AN foot-print to a Rev-A AN foot-print, then the AT can recognize this movement by recognizing the change of subnet (by looking at the overhead messages being transmitted by the sector of the target AN). The following steps are executed after the AT recognizes the subnet boundary was crossed:

1. the AT sends a UATI Request message to Target AN.
2. the target AN retrieves this AT's session information from a source AN.
3. the AT and target AN continue using the session information and protocols that the target AN retrieved from the source AN.

The major problem experienced here is that even though both the AT and the target AN are capable of supporting the advanced set of protocol subtypes, protocols and applications, they both continue using the default set of protocols as negotiated by the Rev-0 source AN. Hence, the AT and the target AN are not able to use efficient/optimized procedures and QoS mechanisms provided by the Rev-A HRPD specification. This is despite the fact that the Rev-A capable AT sends all the non-default subtypes for all protocol types that it supports (in the order of preference) in Configuration Request messages during the session negotiation with the Rev-1 HRPD target AN.

The drawback here is that new HRPD session is not being re-negotiated to upgrade the session protocols to Rev-A even if the Rev-A capable HRPD AT moves to Rev-A capable AN after setting up the initial session in a Rev-0 HRPD AN. This implies that efficient/optimized use of Rev-A protocol subtypes and improved QoS mechanisms are not possible even though both the AT and the AN are Rev-A capable.

Accordingly, there is a need for an improved apparatus and method for triggering session renegotiation between an access network and an access terminal used in a high rate packet data system.

SUMMARY OF THE INVENTION

In addressing the above problem, exemplary embodiments of the present invention propose that, if a Rev-A capable AT moves from a Rev-0 AN to a Rev-A AN, then the session needs to be re-negotiated between the Rev-A capable target AN and the Rev-A capable AT in order to facilitate negotiation of Rev-A protocol subtypes, protocols and applications for efficient operation which ensures better QoS.

Accordingly, an exemplary object of the present invention is to provide a method for triggering re-negotiation of a session when an access terminal moves from one access network to another access network of different capability in a high rate packet data system.

It is another exemplary object of the invention to ensure that the efficient/optimized protocol subtypes, protocols and applications and improved QoS mechanisms are being used through re-negotiation of a session between a Rev-A capable AT and a Rev-A capable AN.

It is yet another exemplary object of the invention to let the Rev-0 Source AN store all the protocol subtypes, protocols and applications that an AT is capable of and then allowing the AT to send this information in priority order during session negotiation and hence facilitating the transfer of this information from the source AN to the target AN during session transfer when the AT moves from one AN to another AN.

It is a further exemplary object of the invention to let the AT send the protocol subtypes, protocols and applications and other AT capability information to the target AN after it moves to the new AN or by letting the Rev-A capable AN to query the AT's capability information and then the AT providing this information It is also an exemplary object of the invention to effect the negotiation by introducing revision (like Protocol revision) information in overhead information messages that an AN broadcasts to all ATs.

Accordingly, an exemplary embodiment of the invention provides a method for triggering re-negotiation of a session when an access terminal moves from one access network to another access network of different capabilities in a high rate packet data system, the method comprising the steps of:

(a) an AT sending a UATI Request message to a target AN with its UATI in a MAC header of an access channel capsule when the AT recognizes that it has crossed a subnet boundary or an AN foot print;

(b) the target AN acquiring the source AN address from the UATI and initiating session transfer from source AN to target AN;

(c) the source AN sending all the session information along with all non-default subtypes of all protocol types and all Application Subtypes that the AT supports;

(d) the source AN including the ATSupportedNonDefaultProtocolSubTypes parameter in the Session State Information Record if the source AN supports Extended Session State Information Record (ESSIR) defined in the Inter-Operability Specification document;

(e) the target AN checking whether both the AN and the AT can support better protocol subtypes, protocols and applications than the ones currently in use and hence initiating the session renegotiation if both the AT and the AN are capable of advanced Protocol Types, Protocol Subtypes and application subtypes; and (f) the AN and the AT continuing to use the re-negotiated Protocol Types, Protocol Subtypes and Application Subtypes.

Another exemplary embodiment of the invention provides a method for triggering re-negotiation of a session when an access terminal (AT) moves from one access network (source AN) to another access network (target AN) of different capability in a high rate packet data system, the method comprising the steps of:
- a) the AT sending a UATI Request message to a target AN after determining that it has crossed a subnet boundary or an AN foot print;
- b) the target AN acquiring the source AN address from the UATI and retrieving the session information from the source AN;
- c) the AT sending the information related to all supported non-default subtypes for all protocol types and all supported application subtypes and any other relevant capability information to target AN After UATI Request and UATI Assignment transactions;
- d) the target AN checking whether both the target AN and the AT can support enhanced protocol types, protocol subtypes and application subtypes and initiating session re-negotiation if both the AT and the target AN are capable of enhanced protocol subtypes, protocols and applications; and
- e) the AN and the AT continuing use of the re-negotiated protocol subtypes, protocols and applications.

Yet another exemplary embodiment of the invention confers a method for triggering re-negotiation of a session when an access terminal moves from one access network to another access network having different capability in a high rate packet data system, the method comprising the steps of:
- a) the AN broadcasting the information related to the minimum and maximum revisions that it supports in an overhead information message like a sector parameter message;
- b) the AT checking the minimum and maximum revisions that the AN supports and comparing that with its capabilities and also with the current HRPD session parameters;
- c) initiating the session re-negotiation if the AT determines that the session needs to be re-negotiated; and
- d) the AN and the AT continuing use of the re-negotiated protocol subtypes, protocols and applications.

These and other exemplary objects, features and advantages of exemplary embodiments of the present invention will become more readily apparent from a reading of the following description taken in conjunction with the accompanying drawings.

BRIEF DESCRIPTION OF THE ACCOMPANYING DRAWINGS

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 5:
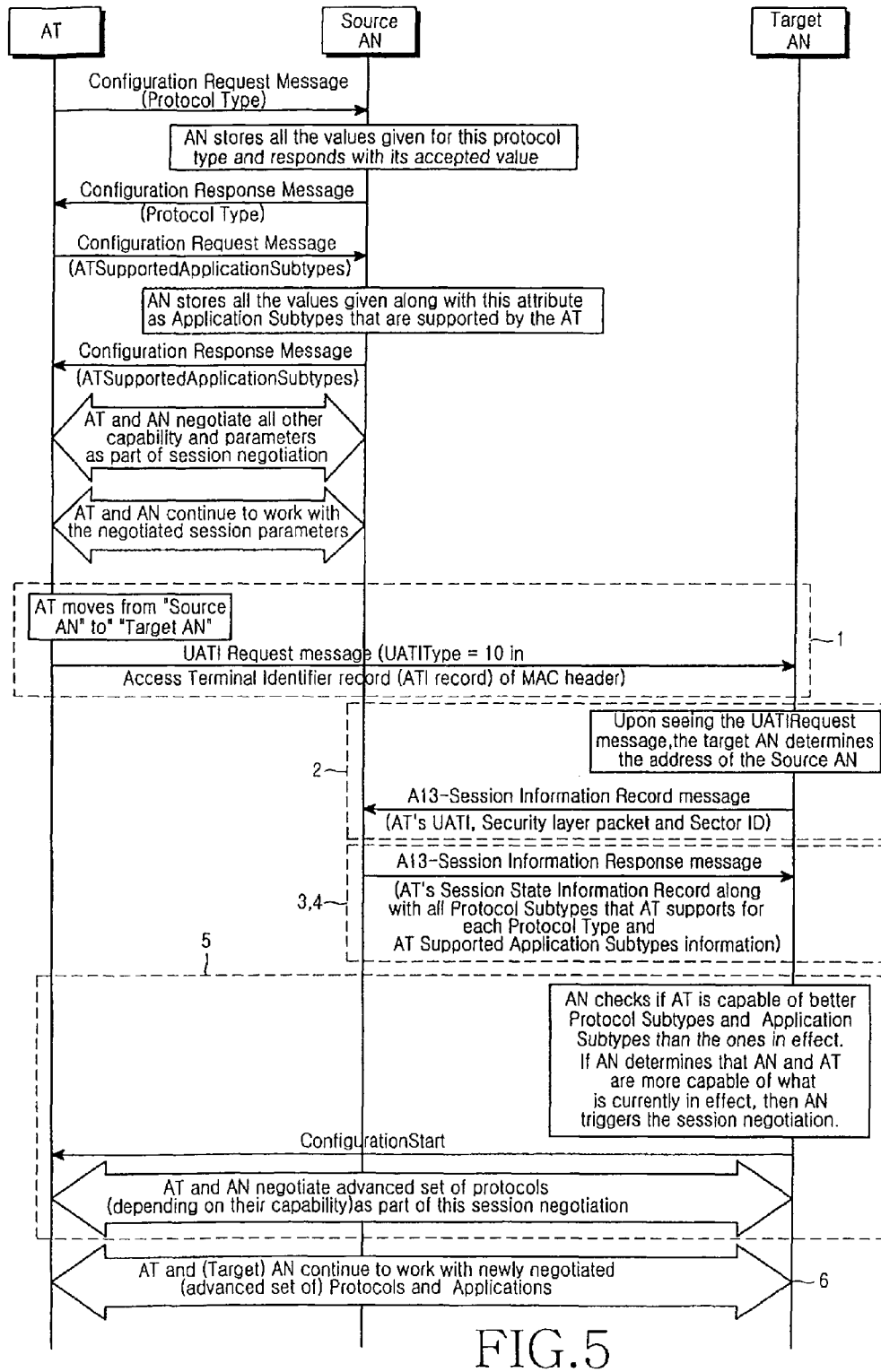
FIG. 5 shows an operation of an exemplary embodiment when an AT moves from a source AN to a target AN.

In an exemplary embodiment of the invention, if a Rev-A capable AT moves from a Rev-0 AN to a Rev-A AN, then the session needs to be re-negotiated between the Rev-A capable target AN and the Rev-A capable AT in order to facilitate negotiation of Rev-A protocol subtypes, protocols and applications for efficient operation which ensures better QoS capabilities. According to an exemplary embodiment of the invention as shown in FIG. 5, a source AN is allowed to store all the protocol subtypes, protocols and applications that the AT is capable of and also allowing the AT to send this information in priority order during session negotiation and hence facilitating the transfer of this information from the source AN to a target AN during session transfer when the AT moves from one AN to another AN.

Figure 1:
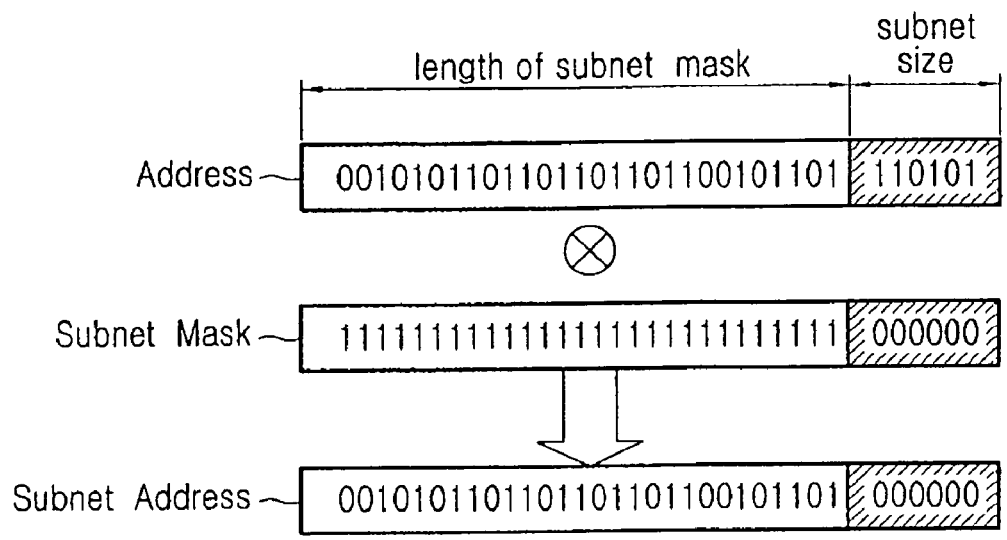
FIG. 1 shows the SectorID/UATI structure, which illustrates a subnet.
Figure 2:
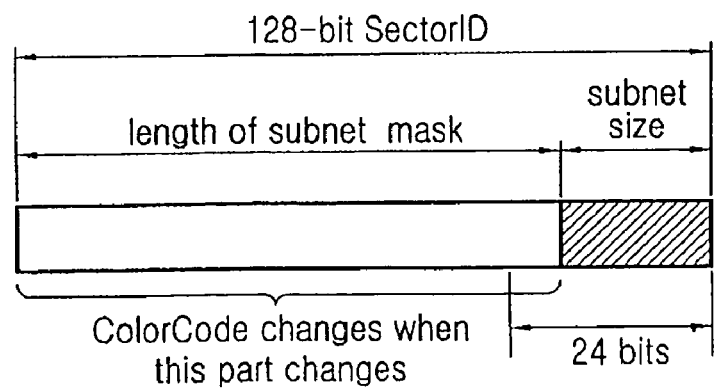
FIG. 2 shows the SectorID structure, which illustrate ColorCode.
Figure 3:
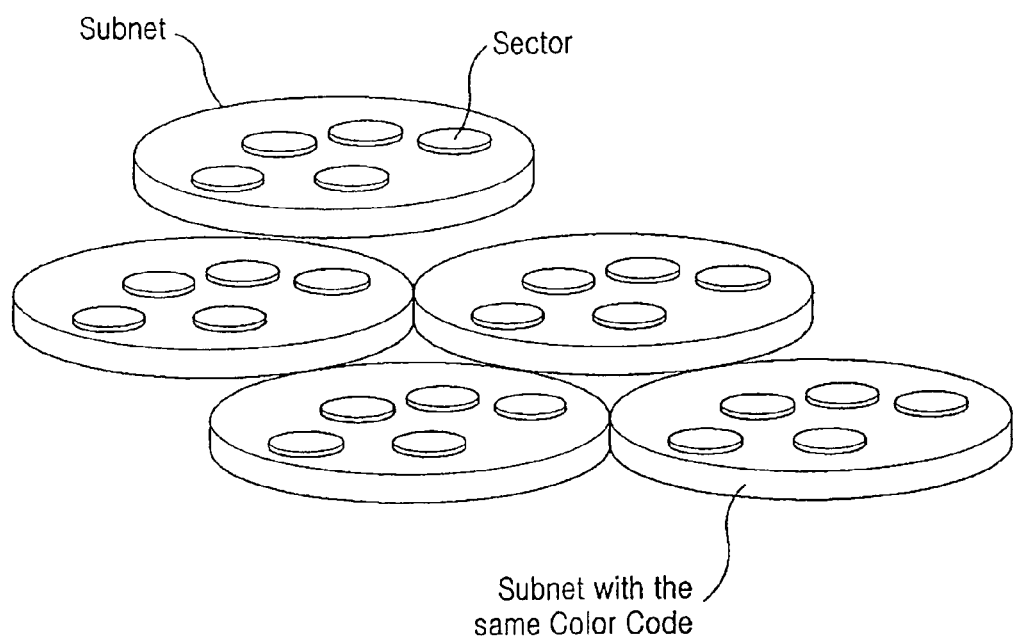
FIG. 3 illustrates ColorCode re-use.
Figure 4:
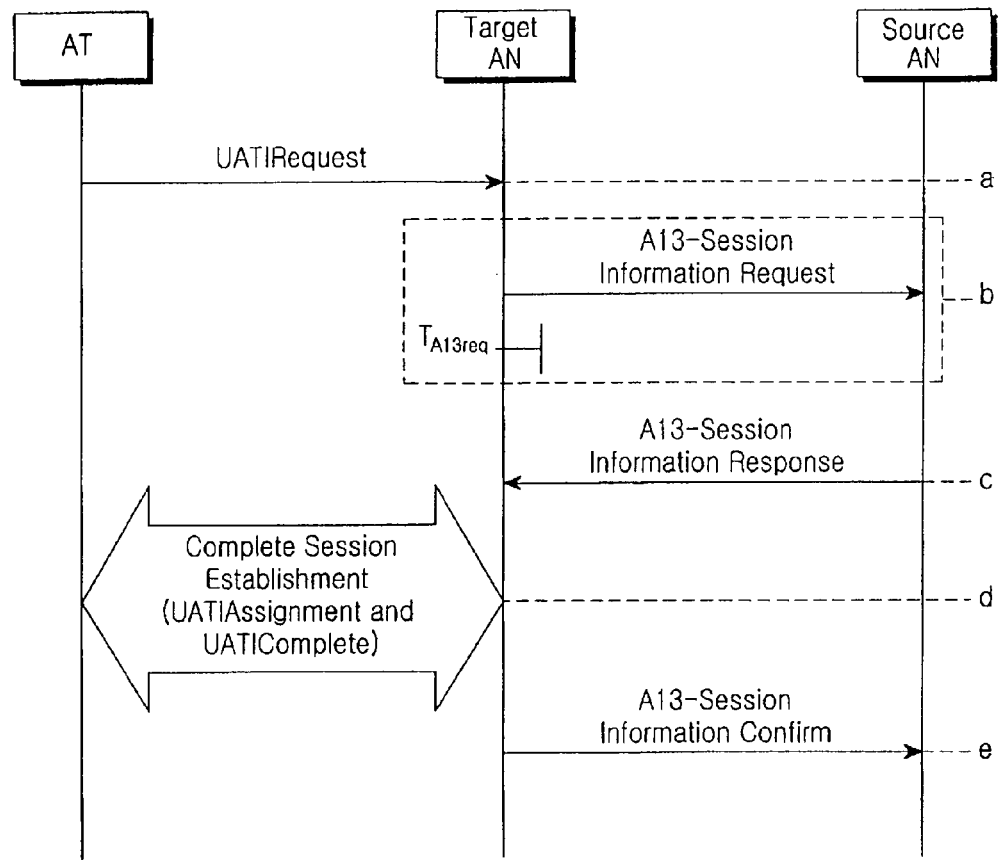
FIG. 4 shows session transfer from a source AN to a target AN.

Here, a new Parameter Record is to be included in a Session State Information Record (SSIR) and is to be carried in an A13-Session Information Response when a source AN is transferring session information to a target AN (see FIG. 4). The Session State Information is to be used for transferring the session parameters corresponding to the InUse protocol instances from a source AN to a target AN. Session parameters are the attributes and the internal parameters that define the state of each protocol. This parameter record consists of all AT supported non-default subtypes of all protocol types. Also, a new attribute record is defined which will carry all AT supported Application Subtypes. Sending this new attribute by a Rev-A AT will be mandatory. Being an attribute, AT Supported Applications information is automatically included in the SSIR when a source AN is transferring session information to a target AN when an AT moves from one AN to another AN.

During the session negotiation, the AT includes, in the Configuration Request messages, all supported non-default subtypes of all protocol types. Subsequently, a Rev-A capable AT sends all the supported Application Subtypes in the ATSupportedApplicationSubtypes attribute and an AN stores this information along with other session information. An AN need not store HardLink subtype. It is to be noted here that according to the prior art, an AN stores only the agreed protocol subtypes as part of the session information. But the procedure according to an embodiment of the present invention mandates the AN to store all non-default subtypes of all protocol types that are supported by the AT. Also in the prior art, an AN does not have information about all the application subtypes that the AT supports. In the new exemplary embodiment, a new attribute ATSupportedApplicationSubtypes is introduced for this purpose.

Method-1

A brief description will now be made of an exemplary embodiment with reference to FIG. 5.

An AT transmits a Confirmation Request message with a protocol type to a first AN which is a source AN. Then the AN stores all values given as the protocol type, and transmits a Configuration Response message to the AT in response to a received value thereof. Then the AT transmits a Configuration Request message including an ATSupportedApplicationSubtypes record with non-default information supportable in the AT to the AN. As a result, the AN stores all information received from the AT as described above. Thereafter, the AN transmits a Configuration Response message to the AT. Subsequently, the AT negotiates with the AN over parameters as part of the session, and then communicates with the AN using the parameter values. The foregoing process is followed by the following steps:

1. when an AT recognizes that it has crossed a subnet boundary or an AN foot print, the AT sends a UATI Request message to a target AN with its UATI in a MAC header of an Access Channel capsule;
2. the target AN derives the source AN address from the UATI and initiates session transfer from the source AN to the target AN;
3. the source AN sends all the session information along with all non-default subtypes of all protocol types and all Application Subtypes that the AT supports. The ProtocolSubtypes for a protocol Type shall be in the same order that the AT has sent in the ConfigurationRequest message.
4. the source AN includes the ATSupportedNonDefaultProtocolSubTypes parameter in the Session State Information Record if the source AN supports Extended Session State Information Record (ESSIR) defined in Inter-Operability Specification document;
5. the target AN checks if both the target AN and the AT can support better protocol subtypes, protocols and applications than the ones currently in use and initiates session renegotiation if both the AT and target AN are capable of advanced Protocol Types, Protocol Subtypes and Application Subtypes;
6. the target AN and the AT continue using the re-negotiated Protocol Types, Protocol Subtypes and Application Subtypes.

The new parameter record (sent as SSIR) is defined as follows:

ATSupportedNonDefaultProtocolSubTypes Parameter:

| Field | Length (bits) |
| --- | --- |
| ParameterType | 8 |
| Length | 8 |
| One or more occurrences of the following record: | |
| TypeLength | 1 |
| ProtocolType | 7 or 15 |
| NumProtocolSubtypes | 8 |
| NumProtocolSubTypes occurrences of the following field: | |
| ProtocolSubtype | 16 |

ParameterType This field shall be set to 0x02 for this parameter record.
Length This field shall be set to the length of this parameter record in units of octets excluding the Length field.
ProtocolType This field has the following format:
TypeLength The sender shall set this field to '0' if the Type field is 7 bits long. Otherwise, the sender shall set this field to '1'.

| Sub-Field | Length (bits) |
| --- | --- |
| Type1 | 7 |
| Type2 | 0 or 8 |

Type1 This sub-field shall be set to the seven most significant bits of the Type value for the protocol to which the associated ProtocolSubtypes belong to.
Type2 If the length of the Type value for the protocol associated with the encapsulated parameter is 7 bits, then this sub-field shall be omitted. Otherwise, this field shall be set to the 8 least significant bits of the Type value for the protocol to which the associated ProtocolSubtypes belong to.
NumProtocolSubtypes
   This field shall be set to the number of occurrences of the ProtocolSubtype field following this field in this record.
ProtocolSubtype This field shall be set to the non-default subtype of the protocol Type encapsulated in this record. This field shall not be set to the HardLink subtype. The ProtocolSubtypes for a protocol Type shall be in the same order that the access terminal has sent in the ConfigurationRequest messages.
ATSupportedApplicationSubtypes Attribute:

| Field | Length (bits) | Default |
| --- | --- | --- |
| Length | 8 | N/A |
| AttributeID | 16 | N/A |
| One occurrence of the following record: | | |
| ValueID | 8 | N/A |
| NumAppSubtypes | 8 | 0 |
| NumAppSubtypes occurrences of the following field: | | |
| ApplicationSubtype | 16 | N/A |

Length Length of the complex attribute in octets. The access terminal shall set this field to the length of the complex attribute excluding the Length field.
AttributeID The access terminal shall set this field to 0x1001.
ValueID The access terminal shall set this field to an identifier assigned to this complex value.
NumAppSubtypes This field shall be set to the number of occurrences of the ApplicationSubtype field following this field in this record.
ApplicationSubtype This field shall be set to the Application Subtype that the access terminal supports.

Method-2

According to an alternate exemplary method of the invention, an AT sends its capability information (e.g. all supported non-default subtypes for all protocol Types and all supported application subtypes) to a target AN after it crosses an AN foot print or a subnet boundary.

The detailed steps are as follows: (The flow described below is a modified example of Method-1, and may not be fully matched to the process of FIG. 5).

1. after an AT determines that it has crossed a subnet boundary or an AN foot print, it sends a UATI Request message to a target AN;
2. the target AN derives the source AN address from the UATI and retrieves the session information from a source AN;

3. after the UATI Request and the UATI Assignment transaction, the AT sends the information related to all supported non-default subtypes for all protocol Types and all supported application subtypes and any other relevant capability information to the target AN;
   a. This step can be restricted only when the AT is moving from one AN to another AN and the AT has default subtypes configured for all protocol Types and Applications and if the AT supports non-default subtype for any protocol Type or Application Subtype.
   b. Also this step can be executed by the AT voluntarily or upon a Query from the target AN (which could be rev-A capable AN). The target AN can query for this information if the AT has default subtypes configured for all protocol Types and Application Subtypes and if the target AN supports non-default subtype for any protocol Type or Application Subtype.
4. the target AN checks if both the target AN and the AT can support enhanced protocol subtypes, protocols and applications as compared to the ones currently in use and initiates session re-negotiation if both the AT and the target AN are capable of enhanced protocol subtypes, protocols and applications; and
5. the target AN and the AT continue using the re-negotiated protocol subtypes, protocols and applications.

The following message structures show the possible message structure for a Query message from an AN and response message from an AT.

ATNonDefaultSubtypesProtocolsQuery Message:
The AN sends this message when it wants to know the protocol subtypes supported by the AT.

| Field | Length (bits) |
|---|---|
| MessageID | 8 |
| TransactionID | 8 |

MessageID The access network shall set this field to 0x09.
TransactionID The access network shall increment this value modulo 256 for each new ATNonDefaultSubtypesProtocolsQuery message sent.

ATSupportedNonDefaultProtocolSubTypes Message:
The access terminal sends this message in response to ATNonDefaultSubtypesProtocolsQuery message.

| Field | Length (bits) |
|---|---|
| MessageID | 8 |
| TransactionID | 8 |
| One occurrence of the following record: | |
| TypeLength | 1 |
| ProtocolType | 7 or 15 |
| NumProtocolSubtypes | 8 |
| NumProtocolSubTypes occurrences of the following field: | |
| ProtocolSubtypes | 16 |
| NumAppSubtypes | 8 |
| NumAppSubtypes occurrences of the following field: | |
| ApplicationSubtype | 16 |

MessageID The access terminal shall set this field to 0x0a.
TransactionID The access terminal shall set this field to the TransactionID field of the corresponding ATNonDefaultSubtypesProtocolsQuery message sent.

TypeLength The sender shall set this field to '0' if the Type field is 7 bits long. Otherwise, the sender shall set this field to '1'.
ProtocolType This field has the following format:

| Sub-Field | Length (bits) |
|---|---|
| Type1 | 7 |
| Type2 | 0 or 8 |

Type1 This sub-field shall be set to the seven most significant bits of the Type value for the protocol to which the associated ProtocolSubtypes belong to.
Type2 If the length of the Type value for the protocol associated with the encapsulated parameter is 7 bits, then this sub-field shall be omitted. Otherwise, this field shall be set to the 8 least significant bits of the Type value for the protocol to which the associated ProtocolSubtypes belong to.
NumProtocolSubtypes
   This field shall be set to the number of occurrences of the ProtocolSubtype field following this field in this record.
ProtocolSubtypes This field shall be set to the non-default subtypes of the protocol Type encapsulated in this record. The ProtocolSubtypes for a protocol Type shall be in the same order that the access terminal has sent in the ConfigurationRequest messages.
NumAppSubtypes This field shall be set to the number of occurrences of the ApplicationSubtype field following this field in this record.
ApplicationSubtype
   This field shall be set to the Application Subtype that the access terminal supports.

Method-3

In yet another exemplary embodiment of the invention, revision information, which will get incremented after every revision to HRPD protocols, is introduced. This revision information reflects the various sets of protocols and their subtype configurations, which will reflect various capabilities of those configurations. It comprises of the following steps:
1. an AN broadcasts the information related to the minimum and maximum revisions that it supports in overhead information messages like a sector parameter message;
2. an AT checks the minimum and maximum revisions that the AN supports and compares that with its capabilities and also with the current HRPD session parameters;
3. if the AT determines that a session needs to be re-negotiated, then the AT initiates session re-negotiation;
4. once session re-negotiation is over, the AN and the AT continue using the re-negotiated protocol subtypes, protocols and applications.

Figure 6:
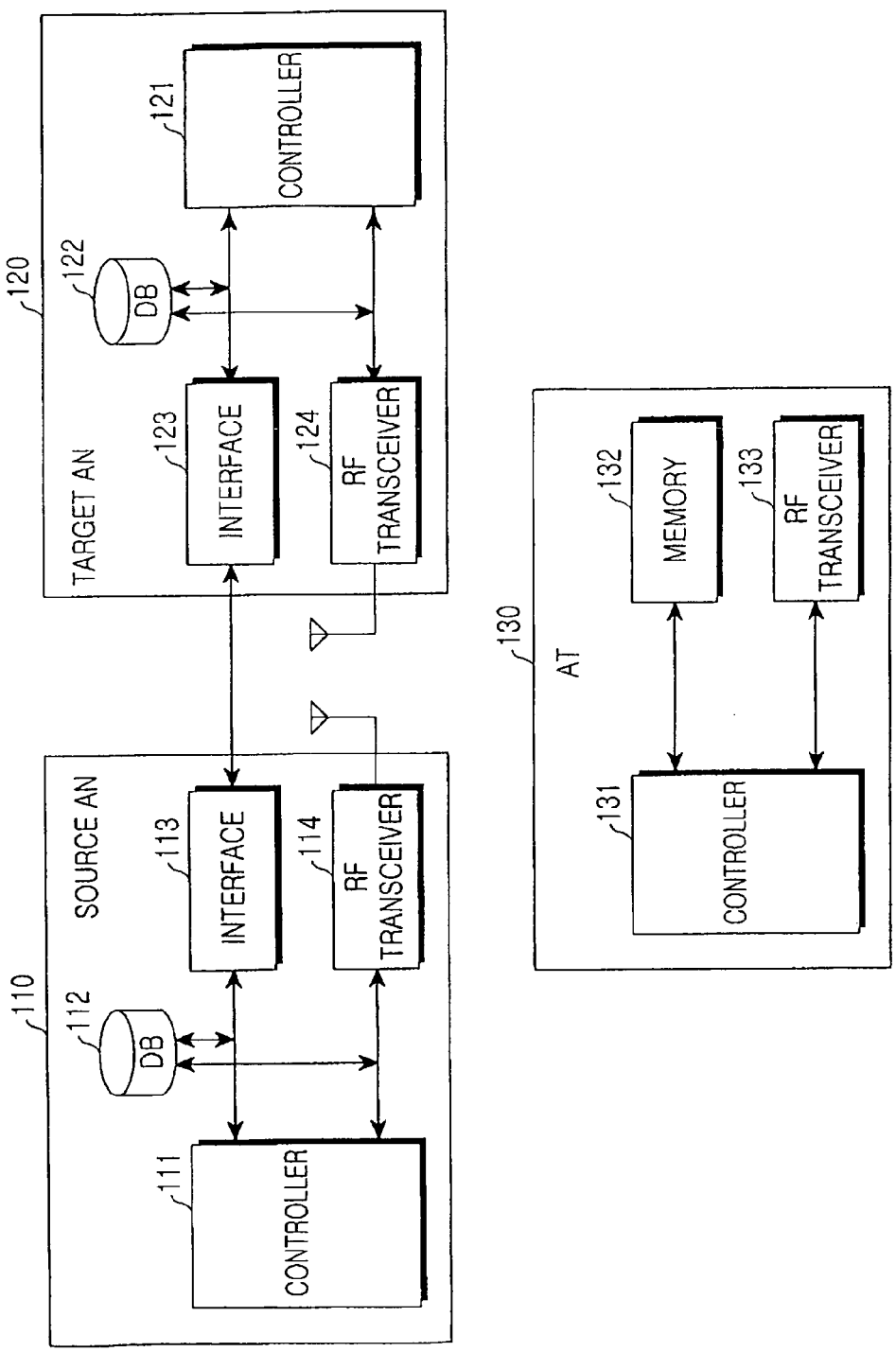
FIG. 6 shows a brief functional block diagram of an AT, a source AN, and a target AN according to an exemplary embodiment of the present invention.

FIG. 6 shows a block diagram of an AT, a source AN, and a target AN according to an exemplary embodiment of the present invention. With reference to FIG. 6, a description will now be made of a structure and operation according to an exemplary embodiment of the present invention.

In FIG. 6, source AN 110 and target AN 120 are equal to each other in structure. However, the source AN 110 has a function of Rev-0 while the target AN 120 has a function of Rev-1. AT 130 has a function of Rev-1. A description will now be made of an operation of the exemplary embodiment.

The AT 130 stores protocols for supporting the function of Rev-1 in a memory 132. The memory 132 can also store information on the session negotiation performed with the source AN 110 or the target AN 120. Once the session negotiation is over, the AT 130 performs communication using other protocol subtypes or applications stored in the memory 132. If the session is updated through the session re-negotiation, the updated session parameters are stored in the memory 132. A controller 131 controls the overall operation of the AT 130, and particularly performs session negotiation and session re-negotiation operations according to the exemplary embodiment of the present invention. These operations correspond to the AT operations described in Method-1, Method-2 and Method-3. A radio frequency (RF) transceiver 133 encodes and modulates control data and user data to be transmitted to an AN, and up-converts the modulated data into an RF signal before transmission. The RF transceiver 133 performs the reverse process when receiving control data, user data and broadcast information from an AN.

The source AN 110 performs the function of Rev-0. A controller 111 performs the overall operation of the source AN 110, and performs session negotiation during initial access of the AT 130 according to the exemplary embodiment of the present invention. If the session negotiation is over, the source AN 110 stores session information and the other information processable by the AT 130 in a database (DB) 112. An interface 113 is a physical element for performing communication directly with another AN or performing communication with another AN via a node located in its upper layer. Therefore, if the AT 130 moves to another AN, in other words moves to a target AN, the interface 113 can provide information on other functions of the AT 130 to the Target AN 120 according to Method-1, Method-2 or Method-3. An RF transceiver 114 is a physical element for processing data, for session negotiation and data exchange with the AT 130 and broadcasting of control messages. The RF transceiver 114 and the controller 111 have the capability of performing Rev-0.

Finally, respective parts of the target AN 120 are equal in structure to the corresponding parts of the source AN 110, except for the information stored in a DB 122 and the protocol processable in an RF transceiver 124. A controller 121 acquires session information of the AT 130 from the source AN 110, determines whether to perform session re-negotiation, and performs a control operation for supporting the session re-negotiation and the Rev-1 protocol. The other functions of the target AN 120 are equal to the corresponding functions of the source AN 110.

It will also be obvious to those skilled in the art that other control methods and apparatuses can be derived from the combinations of the various methods and apparatuses of the present invention as taught by the description and the accompanying drawings and these shall also be considered within the scope of the present invention. It should also be noted that the host for storing the applications include but are not limited to a computer, mobile communication device, mobile server or a multi function device.

As descried above, the use of the present invention keeps the session with target AN in a good state when the AT moves from one AN to another AN, contributing to improvement of QoS.

While the invention has been shown and described with reference to certain exemplary embodiments thereof, it will be understood by those skilled in the art that various changes in form and details may be made therein without departing from the spirit and scope of the invention as defined by the appended claims and equivalents thereto.

What is claimed is:

1. A method for triggering session re-negotiation between an access terminal (AT) and an access network (AN) by the AT in a mobile communication system, the method comprising the steps of:
   transmitting a Unicast Access Terminal Identifier (UATI) Request message to the AN;
   establishing a session between the AT and the AN;
   transmitting configuration request message comprising non-default protocol types that the AT supports to the AN;
   receiving a configuration response message in response to the configuration request message from the AN; and
   performing communication through session re-negotiation with the AN,
   wherein the session is established using default protocol.

2. The method of claim 1, wherein the configuration request message comprises at least one of the protocol types, protocol subtypes, and the number of protocol subtypes.

3. The method of claim 1, wherein the AN stores the protocol types included in the configuration request message.

4. The method of claim 1, wherein the non-default protocol types further comprise protocol subtypes.

5. An apparatus for triggering session re-negotiation between an access terminal (AT) and an access network (AN) by the AT in a mobile communication system, the apparatus comprising the steps of:
   a radio frequency (RF) transceiver for transmitting a Unicast Access Terminal Identifier (UATI) Request message to the AN, establishing a session between the AT and the AN, and transmitting configuration request message comprising non-default protocol types that the AT supports to the AN;
   a radio frequency (RF) receiver for receiving a configuration response in response to the configuration request message from the AN; and
   a controller for performing communication through session negotiation with the AN,
   wherein the session is established using default protocol types.

6. The apparatus of claim 5, wherein the configuration request message comprises at least one of the protocol types, protocol subtypes, and the number of protocol subtypes.

7. The apparatus of claim 5, wherein the AN stores the protocol types included in the configuration request message.

8. The apparatus of claim 5, wherein the non-default protocol types further comprise protocol subtypes.

* * * * *